US012308195B2

(12) United States Patent
Liu et al.

(10) Patent No.: US 12,308,195 B2
(45) Date of Patent: May 20, 2025

(54) SPARE FUSE CLIP

(71) Applicant: Suzhou Littelfuse OVS Co., Ltd., Suzhou (CN)

(72) Inventors: Renan Liu, Suzhou (CN); Shangchun Pan, Suzhou (CN)

(73) Assignee: Suzhou Littelfuse OVS Co., Ltd., Suzhou (CN)

( * ) Notice: Subject to any disclaimer, the term of this patent is extended or adjusted under 35 U.S.C. 154(b) by 0 days.

(21) Appl. No.: 18/398,706

(22) Filed: Dec. 28, 2023

(65) Prior Publication Data

US 2024/0222061 A1 Jul. 4, 2024

(30) Foreign Application Priority Data

Dec. 30, 2022 (CN) ......................... 202211721419.7

(51) Int. Cl.

*H01H 85/26* (2006.01)
*H01H 85/20* (2006.01)
*H01H 85/22* (2006.01)

(52) U.S. Cl.

CPC ........ *H01H 85/2045* (2013.01); *H01H 85/22* (2013.01); *H01H 85/263* (2013.01)

(58) Field of Classification Search

CPC ....... H01H 85/165–20; H01H 85/2045; H01H 85/22; H01H 85/26–263; H01H 2085/2065–2095; H01H 2085/266
See application file for complete search history.

(56) References Cited

U.S. PATENT DOCUMENTS

| | | | | |
|---|---|---|---|---|
| 5,150,094 A * | 9/1992 | Babini | H01H 85/2045 | 337/186 |
| 6,059,609 A * | 5/2000 | Nieto | H01H 85/2045 | 439/620.27 |
| 2007/0141923 A1* | 6/2007 | Rauscher | H01H 85/0208 | 29/760 |
| 2009/0019971 A1* | 1/2009 | Obama | H01H 85/0208 | 81/3.8 |
| 2011/0136385 A1* | 6/2011 | Groeller | H01H 85/044 | 439/620.26 |
| 2014/0377998 A1* | 12/2014 | Hirasawa | H01H 85/2045 | 439/620.26 |

FOREIGN PATENT DOCUMENTS

| | | |
|---|---|---|
| CN | 109494137 A | 3/2019 |
| EP | 0145088 A2 | 6/1985 |
| WO | 2014181655 A1 | 11/2014 |

OTHER PUBLICATIONS

Extended European Search Report for EP Application No. 23220805.8, dated Jun. 18, 2024, 4 pages.

* cited by examiner

*Primary Examiner* — Jacob R Crum
(74) *Attorney, Agent, or Firm* — KOW Firm PLLC

(57) ABSTRACT

A clip may include a shaft, an overhead, and an underhang. The shaft are located on and perpendicular to a base. The overhead is on and supported by the shaft and is triangular prism-shaped. The underhang is attached to the overhead. The underhang and the base secure a spare fuse.

11 Claims, 7 Drawing Sheets

SPARE FUSE CLIP

CROSS-REFERENCE TO CORRESPONDING APPLICATIONS

This application claims the benefit of priority to, Chinese Patent Application No. 2022117214197, filed Dec. 30, 2022, entitled "SPARE FUSE CLIP," which application is incorporated herein by reference in its entirety.

FIELD OF THE DISCLOSURE

Embodiments of the present disclosure relate to fuse holders and, more particularly, for fuse holders that accommodate spare fuses.

BACKGROUND

Fuses are current-sensitive devices designed to be the intentional weak link in an electrical circuit. Fuses come in a variety of form factors, including bolt-down fuses. Bolt-down fuses feature a fuse body with two terminals extending therefrom, where one or more of the terminals is bolted down to a surface, such as a busbar or printed circuit board (PCB).

Some fuses are contained in a fuse holder, which is a generally airtight housing for the fuse. The fuse holder may have busbars or PCBs therein, with cables extending from the fuse to the circuit(s) to be protected. More extensive fuse holders may include low-voltage power distribution modules and high-voltage power distribution units, which house relays in addition to fuses.

The housing of the fuse holder may be a clam-shell type, with a cover portion already connected to the housing, or the fuse holder may have a separate cover, due to the fact that the fuse holder needs to be accessed when changing the fuse. Occasionally, the fuse holder will also house one or more spare fuses. The typical arrangement is to have the spare fuses bolted down to the housing, which necessitates that the housing be sized to accommodate the particular fuse size. There is also the possibility that the bolts will get lost during the fuse change operation. The fuse housing may also have a plug-in arrangement for holding spare fuses, which does not successfully accommodate fuses of different sizes.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a fuse holder in accordance with the present disclosure may include a housing, a clip, and a cover. The housing is for a fuse, and the fuse is to be connected to and protecting a circuit. The clip includes a base, a pair of shafts, an overhead, and an underhang. The base is for seating a spare fuse. The pair of shafts are on and perpendicular to the base. The overhead is located on and supported by the pair of shafts. The underhang is beneath the overhang and deforms in response to the movement of the spare fuse along the base toward the shaft. The cover is placed over the housing to form an enclosed space around the fuse and the clip.

An exemplary embodiment of a clip in accordance with the present disclosure may include a shaft, an overhead, and an underhang. The shaft is located on and perpendicular to a base. The overhead is on and supported by the shaft and is triangular prism-shaped. The underhang is attached to the overhead. The underhang and the base secure a spare fuse.

DETAILED DESCRIPTION

A fuse holder for holding working fuses features a spare fuse holder inside the housing of the fuse holder. The spare fuse holder includes a clip that has an elastic underhang for exerting pressure on the fuse as it is slid into place in the clip. The clip also has a base with some angled surfaces, two shafts orthogonal to the base for providing structural support, and, between the shafts, a fuse release for enabling ease of removal of the spare fuse. The spare fuse holder is suitable for bolt-down fuses with various current ratings. Unlike the bolt-down type, the spare fuse holder does not use bolts for holding the spare fuse. Unlike the plug-in type, the spare fuse holder successfully holds fuses of different fuse body sizes, terminal sizes, and current ratings.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1:
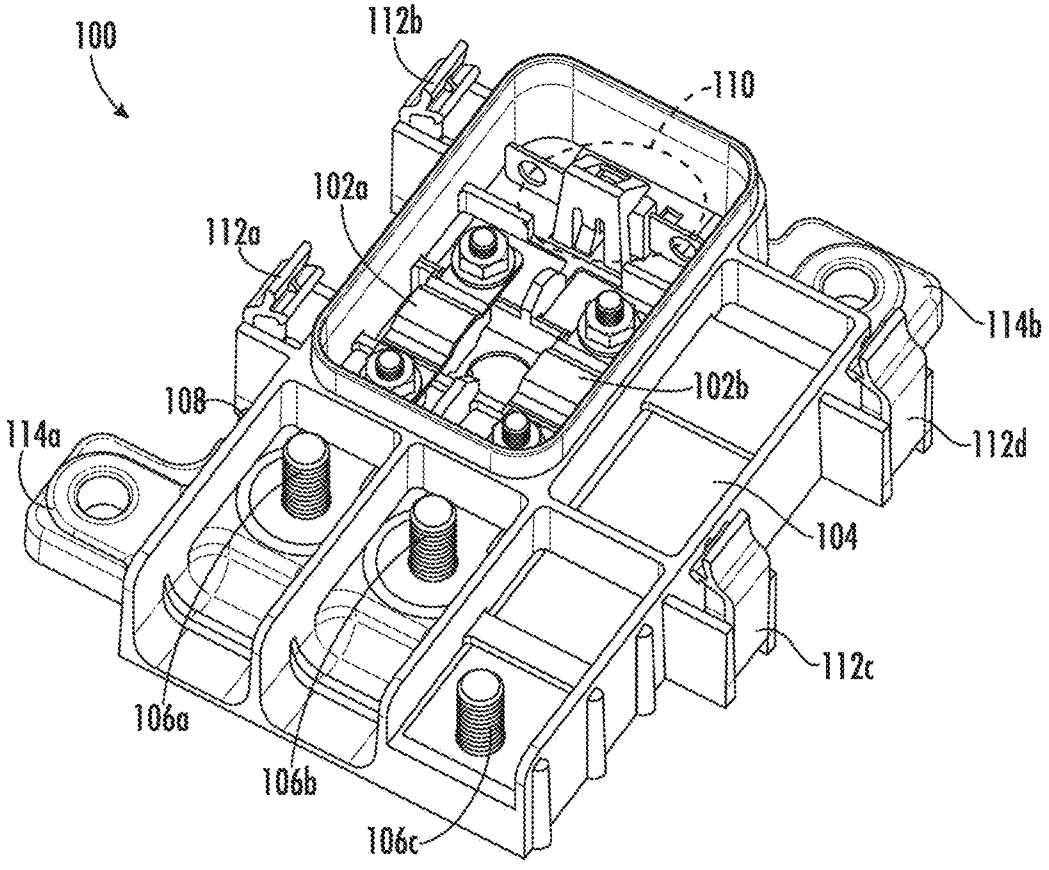
FIG. 1 is a diagram illustrating a fuse holder for holding a spare fuse, in accordance with exemplary embodiments.

FIG. 1 is a representative drawing of a fuse holder 100 (perspective view) for holding fuses and spare fuses, according to exemplary embodiments. The fuse holder 100 includes a housing 108 to hold two fuses 102*a* and 102*b* (collectively, "fuses 102"). In exemplary embodiments, the fuses 102 are bolt-down fuses. The fuse holder 100 also features a busbar 104 which is distributed in several locations in the fuse holder 100. The fuses 102 are each connected at one end to the busbar 104. Bolts 106*a-c* (collectively, "bolts 106") enable connections to be made between the fuse holder 100 and one or more cables or other busbars (not shown). Clamps 112*a-d* (collectively, "clamps 112") enable a cover to be attached to the housing 108, thus ensuring that there is a somewhat air-tight seal for the contents inside the fuse holder 100. Mounting brackets 114*a-b* (collectively, "mounting brackets 114") include apertures for bolting the fuse holder 100 to a surface, although the mounting brackets may be attached to the surface in another way, as this is a non-limiting example.

In exemplary embodiments, the fuse holder 100 features a spare fuse holder 110, shown in the dashed circle. As will be shown, the spare fuse holder 110 overcomes the deficiencies of the prior art by accommodating fuses of different sizes. In exemplary embodiments, the spare fuse holder 110 holds bolt-down fuses, although the design is not limited in this respect. As will be shown, the spare fuse holder 110 is flexible enough to accommodate a variety of different fuse types and shapes.

Figure 2A:
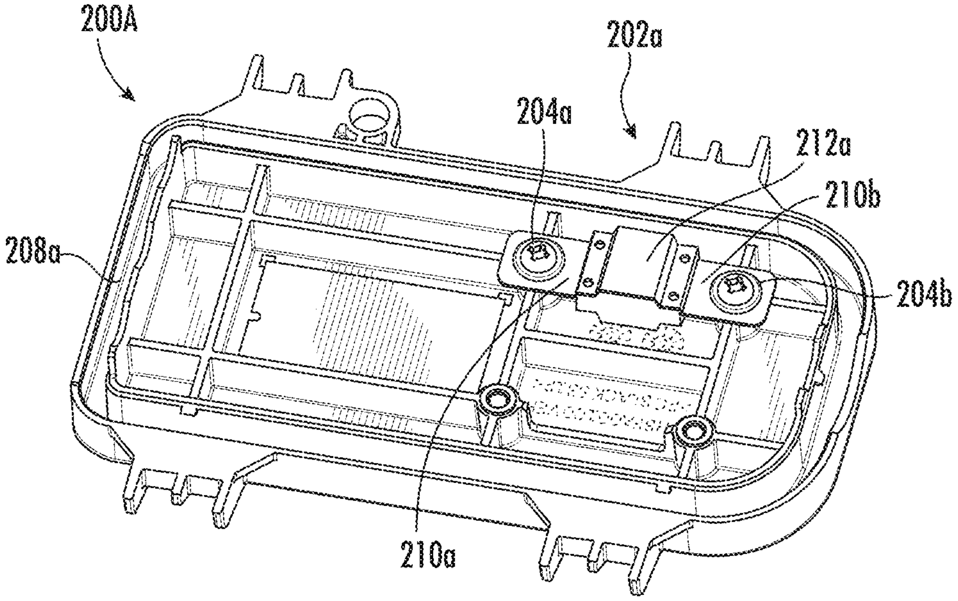
FIG. 2A (PRIOR ART)
FIGS. 2A-2E are diagrams illustrating fuse holders and bolt-down fuses, in accordance with the prior art.
Figure 2B:
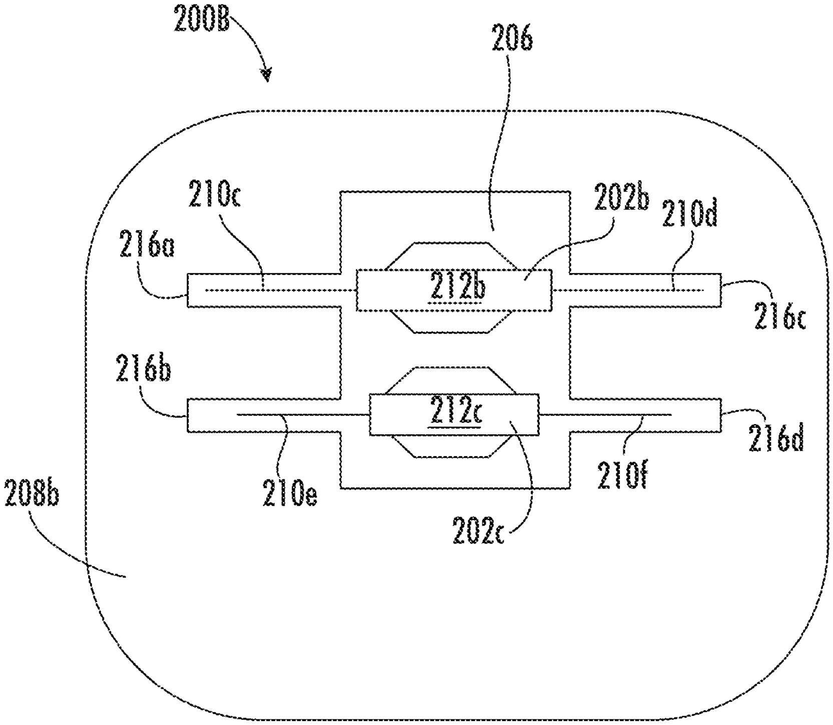
FIG. 2B (PRIOR ART)
Figure 2C:
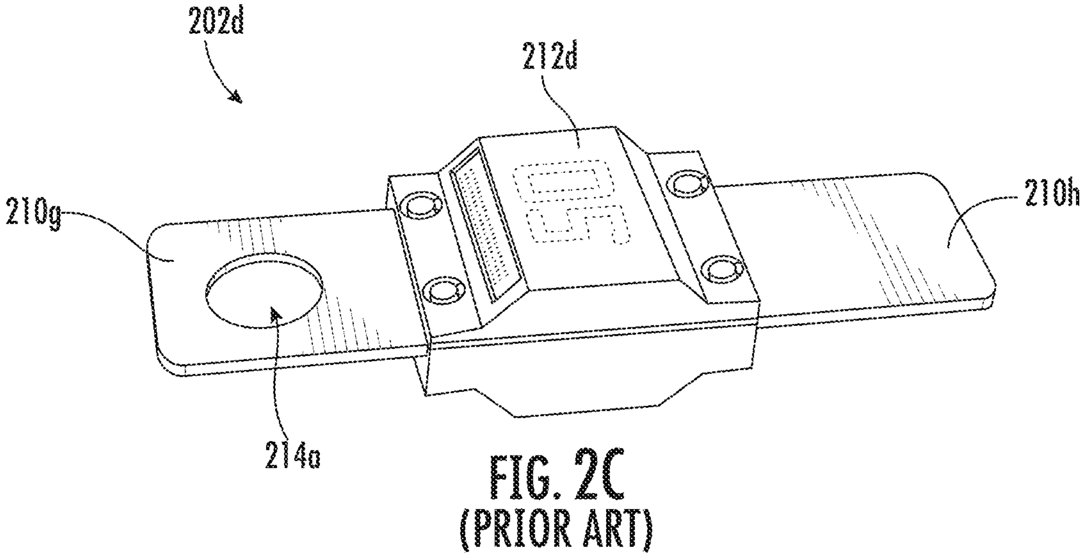
FIG. 2C (PRIOR ART)
Figure 2D:
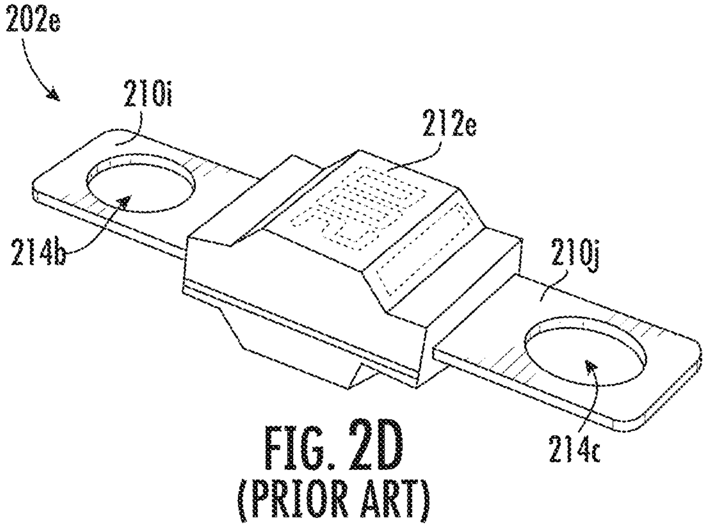
FIG. 2D (PRIOR ART)
Figure 2E:
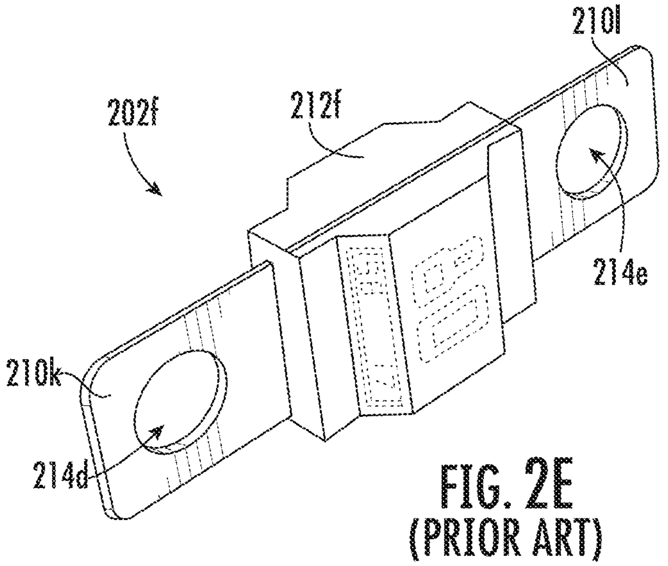
FIG. 2E (PRIOR ART)

FIGS. 2A-2E are representative drawings of fuse holders and bolt-down fuses, according to the prior art. FIG. 2A is a perspective view of a first fuse holder 200A, FIG. 2B is an overhead view of a second fuse holder 200B, and FIGS. 2C-2E are perspective views of bolt-down fuses 20*a-c* (collectively, "spare fuse holders 200" and "bolt-down fuses 202"). For simplicity, the fuse holders 200 do not include the fuses, busbars, bolts, and clamps that characterize typical fuse holders, as these drawings are intended to show and describe the spare fuse holder portion of these devices.

A fuse 202*a* is disposed in the fuse holder 200A (FIG. 2A), fuses 202*b* and 202*c* are disposed in the fuse holder 200B (FIG. 2B), and fuses 202*d* (FIG. 2C), 202*e* (FIG. 2D), and 202*f* (FIG. 2E) are shown (collectively, "fuses 202"). Each fuse 202 includes a fuse body and two terminals, with fuse 202*a* having terminal 210*a*, fuse body 212*a* and terminal 210*b* (FIG. 2A), fuse 202*b* having terminal 210*c*, fuse body 212*b*, and terminal 210*d*, fuse 202*c* having terminal 210*e*, fuse body 212*c*, and terminal 210*f* (FIG. 2B), fuse 202*d* having terminal 210*g*, fuse body 212*d*, and terminal 210*h* (FIG. 2C), fuse 202*e* having terminal 210*i*, fuse body 212*e*, and terminal 210*j* (FIG. 2D), and fuse 202*f* having terminal 210*k*, fuse body 212*f*, and terminal 210*l* (FIG. 2E) (collectively, "terminals 210" and "fuse bodies 212").

The fuse holder 200A features a housing 208*a* with a location for placing the spare fuse 202*a*. The fuse holder 200 holds the spare fuse 202*a* using bolts 204*a* and 204*b* (collectively, "bolts 204"). The fuse holder 200A is thus a "screwing design" of fuse holder since the bolts 204 are screwed into the housing 208*a* to secure the spare fuse 202*a*. With such a design, the housing 208*a* would be assembled with the specific dimensions of the fuse 202*a* in mind. Further, to access the fuse 202*a* (to replace a blow fuse), a screwdriver would be needed to remove the bolts 204 and there is some risk that the bolts would be lost during this process. Further, having the bolts will result in additional assembly time including the process of securing the spare fuse.

The fuse holder 200B features a housing 208*b* with a fuse receptacle 206 suitable for holding the two fuses 202*b* and 202*c*. The fuse holder 200B is thus a "plug-in design" of fuse holder, since the fuses 202*b* and 202*c* are simply plugged into the fuse receptacle 206 (no bolts are needed). The fuse receptacle 206 includes four terminal holders 216*a-d* (collectively, "terminal receptacles 216"), one for each terminal 210 of the two fuses. The terminal holders 216 are designed to clamp the terminals 210 so that the fuses 202 stay in place in the fuse receptacle 206.

The fuse 202*b* is larger than the fuse 202*c* and, due to a difference in current rating between the two fuses, the terminals 210*c* and 210*d* are longer and thicker than the terminals 210*e* and 210*f*. Although able to hold both fuses 202*b* and 202*c*, the terminals holders 216 of the fuse receptacle 206 are all the same size. Thus, the fuse receptacle is sized for the larger fuse 202*b* and the terminal holder 216*a* successfully clamps the terminal 210*c* of the fuse 202*b* while the terminal holder 216*c* successfully clamps the terminal 210*d* of the fuse 202*b*. The same is not true for the fuse 202*c*, as the terminals 210*e* and 210*f* may not be fully clamped by respective terminal holders 216*b* and 216*d* of the fuse receptacle 206. The smaller fuse 202*c* may fall out of the fuse receptacle 206, such as when a cover (not shown) is removed from the housing 208*b* of the fuse holder 200B, which is not a desired outcome.

The fuse receptacle 206 of the fuse holder 200B could be designed differently. That is, the terminal holders 216*b* and 216*d* could be made smaller, for fuses of lower current rating. This, however, limits the fuses that can be accepted by the fuse receptacle 206, which is also not a desired outcome.

The three bolt-down fuses 202*d*, 202*e*, and 202*f* of FIGS. 2C-2E may be suitable for either the screwing design fuse holder 200A or the plug-in design fuse holder 200B. Although similar in shape, there are some differences between the bolt-down fuses 202*d*, 202*e*, and 202*f*. For example, the terminals 210*i* and 210*j* (of bolt-down fuse 202*e*) and the terminals 210*k* and 210*l* (of bolt-down fuse 202*f*) each have apertures, with terminal 210*i* having aperture 214*b*, terminal 210*j* having aperture 214*c*, terminal 210*k* having aperture 214*d*, and terminal 210*l* having aperture 214*e*. In contrast, for the bolt-down fuse 202*d*, terminal 210*g* has an aperture 214*a* (collectively, "apertures 214"), but terminal 210*h* has no aperture. Thus, the bolt-down fuse 202*d* would not be suitable for the fuse holder 200A, as the spare fuse is affixed to the housing 208*a* using two bolts 204. Further, the bolt-down fuses 202*d*, 202*e*, and 202*f* are different sizes and have different current ratings. Thus, the bolt-down fuses 202*d-f* may not be suitable for the fuse holder 200B.

Figure 3A:
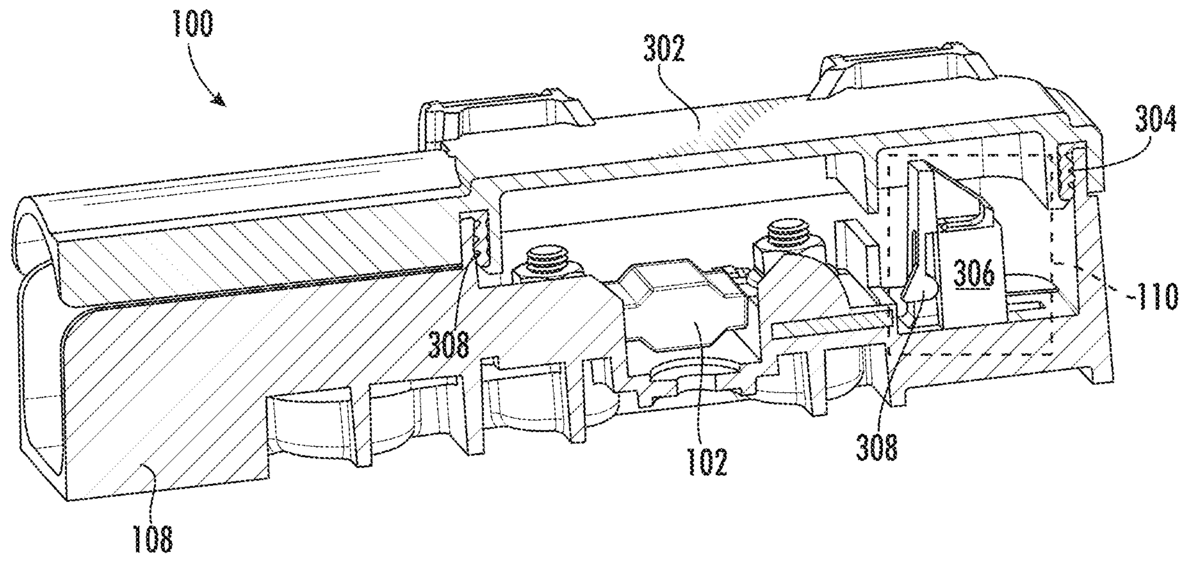
FIGS. 3A-3B are diagrams illustrating the fuse holder of FIG. 1, in accordance with exemplary embodiments.
Figure 3B:
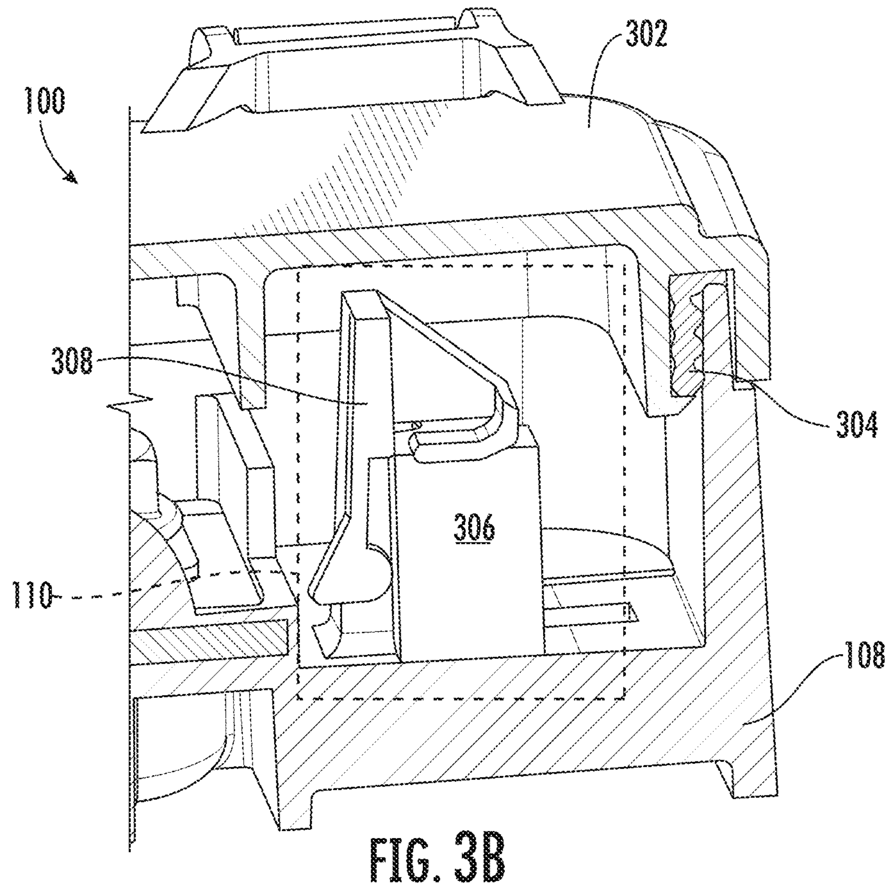

FIGS. 3A-3B are representative drawings of the fuse holder 100 of FIG. 1, according to exemplary embodiments. FIG. 3A is a perspective view and FIG. 3B is a close-up cross-sectional perspective view of the fuse holder 100. The fuse holder 100 is an improvement over the prior art fuse holders 200 in several respects. The fuse holder 100 features a special clip design to hold spare fuses. Compared with the legacy bolt-down and plug-in fuse holders, the fuse holder 100 is more versatile, as the special clip design can support a variety of types of bolt-down fuses. In exemplary embodiments, the fuse holder 100 can support bolt-down fuses having different sizes and current ratings, as well as supporting bolt-down fuses having single-aperture terminals such as the bolt-down fuse 202*d* (FIG. 2C). Further, in some embodiments, the fuse holder 100 can support fuses other than bolt-down fuses.

The spare fuse holder 110 introduced in FIG. 1 is shown in FIGS. 3A and 3B. The fuse 102 which is not a replacement fuse, but is a fuse being used to protect a circuit connected to the fuse holder 100, is also shown in FIG. 3A. The position of the spare fuse holder 110 may differ from what is shown in FIGS. 1, 3A, and 3B, in a non-limiting embodiment. A cover 302 is placed over the housing 108 to form an enclosed spaced which encapsulates both the fuse 102 and the spare fuse holder 110. In exemplary embodiments, the housing 108 and cover 302 are plastic.

In some embodiments, the fuse holder 100 includes a seal 304 which surrounds the perimeter of a top portion of the housing 108. Alternatively, the seal 304 may surround the perimeter of a top portion of the cover 302. In exemplary embodiments, the seal 304 is elastomeric and provides an airtight enclosed space for the fuse 102 and the spare fuse holder 110.

The spare fuse holder 110 includes a clip 308 and a fuse 306. The fuse 306 is shown as a rectangular cube to represent a generalized shape of the body of a fuse, such as one of the fuse bodies 212 shown in FIGS. 2C-2E. In exemplary embodiments, the clip 308 is capable of holding any thickness of fuses tightly. The fuses are easy to load and unload and are particularly more convenient than the bolt-down spare fuse holders. In exemplary embodiments, the spare fuse holder 110 is capable of holding a fuse having a fuse body of up to 12 mm with stability. Further, the design of the spare fuse holder 110 can be scaled for larger fuses, including high-voltage fuses, in some embodiments.

Figure 4A:
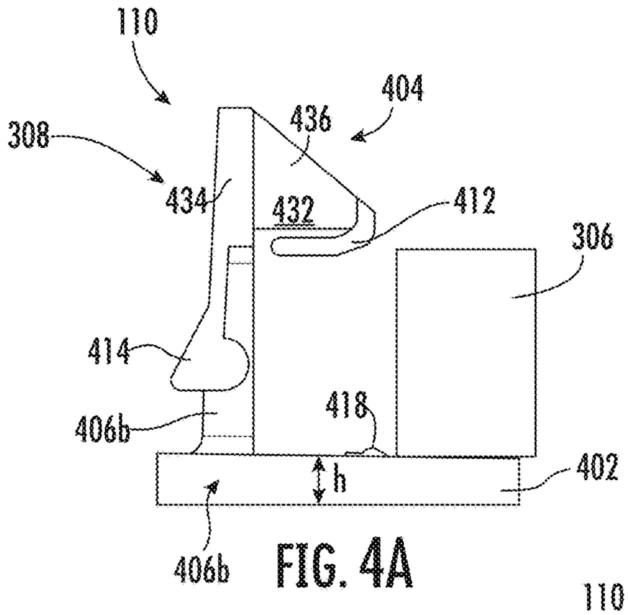
FIGS. 4A-4F are diagrams illustrating a special clip used by the fuse holder of FIG. 1, in accordance with exemplary embodiments.
Figure 4B:
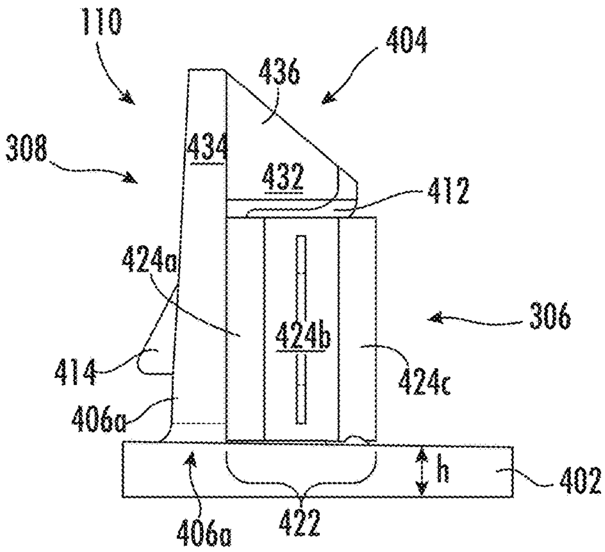
Figure 4C:
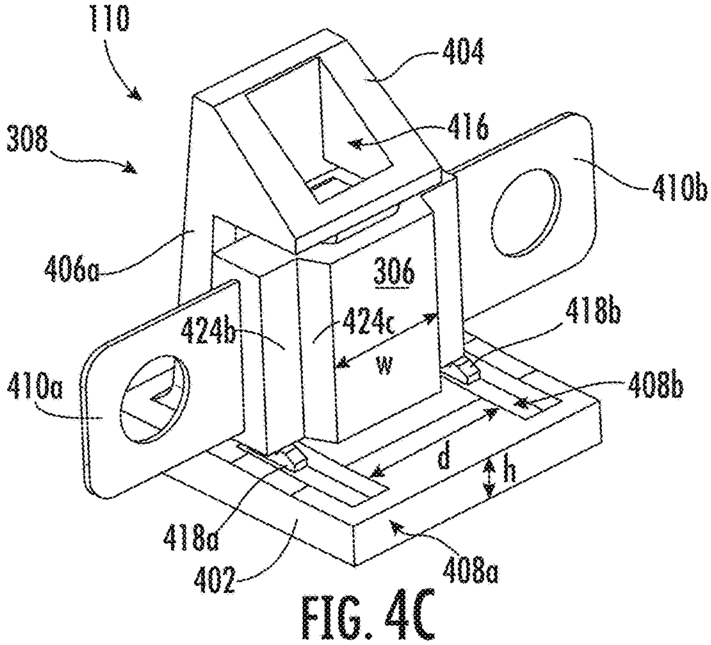
Figure 4D:
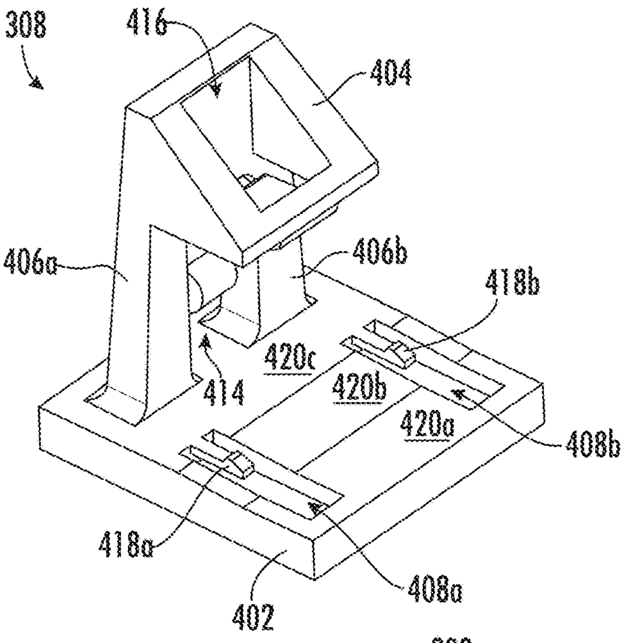
Figure 4E:
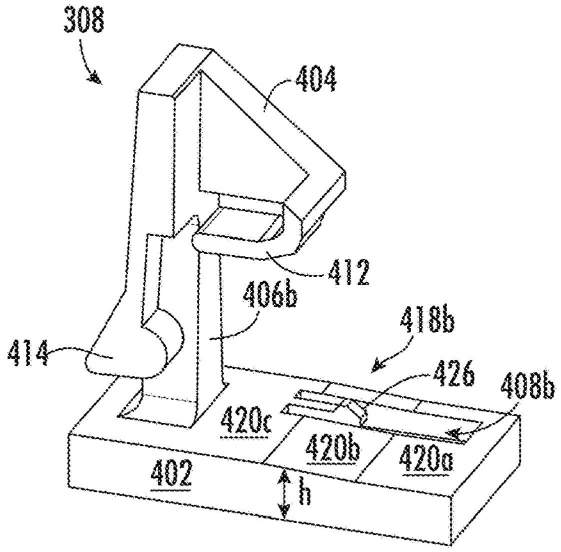
Figure 4F:
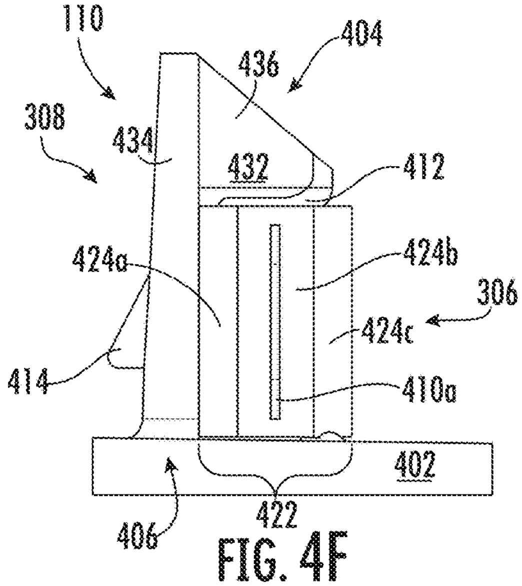

FIG. 4A-4F are representative drawings of the spare fuse holder 110 that is part of the fuse holder 100 of FIG. 1, according to exemplary embodiments. FIG. 4A is a side cross-sectional view of the spare fuse holder 110 before the fuse is installed (clip is in a resting state), FIG. 4B is a side view of the spare fuse holder after the fuse is installed (clip is in holding state), FIG. 4C is a perspective view of the spare fuse holder with the fuse installed, FIG. 4D is a perspective view of the clip without the fuse, FIG. 4E is a cross-sectional perspective view of the clip, and FIG. 4F is a side view of the spare fuse holder with the fuse installed (clip is in holding state). Once a cover is placed over the housing which holds the clip 308 and spare fuse 306, an enclosed spaced is formed which encapsulates both the fuse 102 and the clip.

In exemplary embodiments, the clip 308 features a base 402, a pair of shafts 406*a-b* (collectively, "shafts 406"), and an overhead 404, with both shafts being visible in FIG. 4D. The base 402 is for seating the spare fuse 306 and the shafts are orthogonal (perpendicular) to the base and support the overhead. The overhead 404 has three sides 432, 434, and 436 which form a triangular prism. From the side, such as in the views of FIGS. 4A-B and 4D, the overhead 404 resembles a right triangle, with a first side 432 (bottom, horizontal side) being an extension of the shaft 406, a second side 434 (vertical side) being perpendicular to the first side, and the third side 436 (right-angled side) being angled. In a non-limiting embodiment, the third side 436 is at a 45° angle relative to the first side 432 and the second side 434. The overhead 404 further has an opening 416 that cuts away the central part of the first side 432 and the third side 436, exposing an inner portion of the second side 434. Thus, instead of being a solid triangular prism-shaped structure, the overhead 404 is a hollowed out triangular prism.

An underhang 412 is disposed beneath and attached to the overhead 404. As shown particularly in the cross-sectional view of FIG. 4E, the underhang 412 extends downward from the side 432 of the overhead 404, and is curved so that, except for the end connection to the overhead, is substantially parallel to the side 432 in its resting state. In exemplary embodiments, the underhang 412 is an elastomeric material having the ability to deform its shape in reaction to pressure, e.g., the pressure coming from the top of the spare fuse 306, which causes the underhang 412 to compress toward the overhang 404, e.g., in an upward direction. In other embodiments, both the underhang 412 and the overhead 404 are elastomeric.

Beneath the third side 434 of the overhang 404 and disposed between the shafts 406 is a fuse release 414. The fuse release 414 is most visible in FIG. 4A, as only the shaft 406*b* is visible. The fuse release 414 extends downward from the side 434 of the overhead 404. In a non-limiting embodiment, the fuse release 414 has an angular side that juts out from the back of the clip 308, making it easy to push the fuse release, and a second curved side opposite the angular side that pushes against the fuse body 422 when the fuse release 414 is pushed (depressed) toward the region in between the two shafts 406. In exemplary embodiments, the fuse release 414, with contact, pushes the spare fuse 306 away from the pair of shafts 406, causing the spare fuse to be released from the clip 308. In exemplary embodiments, the fuse release 414 is an elastomeric material having the ability to deform its shape in reaction to pressure. By being pressed, the fuse release 414 moves toward the installed spare fuse 306, which causes the spare fuse 306 to move out from under the clip 308.

In exemplary embodiments, the base 402 consists of three surfaces, a surface 420*a*, a surface 420*b*, and a surface 420*c* (collectively, "surfaces 420"). Although substantially planar to one another, the surfaces 420*a* and 420*b* are angled slightly, to facilitate leading the spare fuse 306 to the clip 308. Extending across the surfaces, 420 are two tracks 408*a* and 408*b* (collectively, "tracks 408"). The tracks 408 are rectangular cutouts which are perpendicular to the surfaces 420, are disposed adjacent two opposing sides ends of the base 402, and have a depth that is slightly less than the height, h, of the base 402. Each track 408 has a fuse clip, with track 408*a* having fuse clip 418*a* and track 408*b* having fuse clip 418*b* (collectively, "fuse clips 418"). The fuse clips 418 are close to the side of the tracks 408 that are adjacent the shafts 406. The fuse clips 418 have an angled tip portion 426 (FIG. 4E) that, when pressed, will cause each fuse clip to move into the cavity (channel) of its respective track 408. In the illustrated embodiments, the movement of each fuse clip 418 would be downward into the respective tracks 408. A close-up view of the angled tip portion 426 is shown in FIG. 5D, below. In exemplary embodiments, the depths of the tracks 408 are slightly greater than a height, $h_2$, of the angled tip portion 426 of the fuse clips 418 (see FIG. 5D). Like the underhang 412 and the fuse release 414, the fuse clips 418 are elastomeric, in exemplary embodiments.

In exemplary embodiments, the base 402, the shaft 406, the overhead 404, the underhang 412, the fuse release 414, and the fuse clips 418 are made of a thermoplastic material using injection molding operations. In some embodiments, the overhead 404, underhang 412, the fuse release 414, and the fuse clips 418 are impregnated with an elastomeric material, thus allowing the clip 308 to be both flexible in the impregnated regions and rigid in the other, non-impregnated regions. In this way, the base 402, shafts 406, and overhead 404 are a support structure for the spare fuse 306.

In exemplary embodiments, the spare fuse 306 is a bolt-down fuse, which has a fuse body 422 and terminals 410*a-b* (collectively, "terminals 410"), with the fuse body having three portions 424*a-c* (collectively, "portions 424"). In exemplary embodiments, the track 408*a* is a distance, d, from the track 408*b*, where the distance, d, is larger than the width, w, of portions 424*a* and 424*c* of the fuse body 422, as the width of portion 424*a* is substantially similar to the width of portion 424*c* (see FIG. 4C). The portion 424*b* is wider than the portions 414*a* and 424*c* (see FIG. 4C), such that, when the spare fuse 306 is moved into the clip 308, the portion 424*b* slides over the tracks 408 but the portions 424*a* and 424*c* do not slide over the tracks. In exemplary embodiments, as the spare fuse 306 is slid across the base 402, the portion 424*b* pushes against the angled tip portion 426 of respective fuse clips 418, causing the fuse clips to move downward into respective tracks 408. Being narrower in width than the portion 424*b*, the portion 424*a* does not contact the fuse clips 418. Then, when the portion 424*b* slides across the tracks 408, the portion 424*b* does contact the fuse clips 418 and pushes them down into the tracks 408. Finally, when the spare fuse 306 is flush against the shafts 406 of the clip 308, the portion 424*b* of the fuse body 422 moves past the fuse clips 418 and the fuse clips move again upward from the tracks 408. In exemplary embodiments, by moving back upward to their original positions, the angled tip portion 426 of the fuse clips 418 act as a stop to the spare fuse 306.

Where the spare fuse is shaped differently than the standard bolt-down fuse, with the three portions described above, the fuse clips 418 may remain in the down position within the tracks 408, in some embodiments. Because the underhang 412 is exerting downward pressure thereon, the spare fuse will nevertheless remain in place within the clip 308. The length of the fuse clips 418 or the size and shape of the angled tip portion 426 may be adjusted to support a spare fuse having a different fuse body than the fuse body 422 of the spare fuse 306.

Figure 5A:
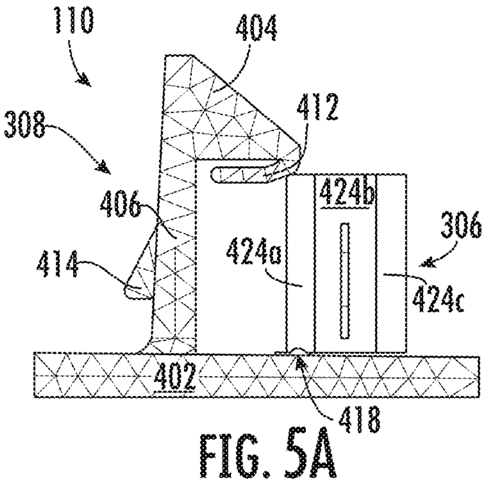
FIGS. 5A-5D are diagrams illustrating a special clip used by the fuse holder of FIG. 1, in accordance with exemplary embodiments.
Figure 5B:
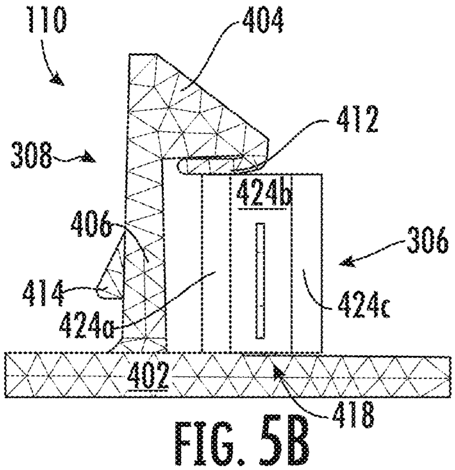
Figure 5C:
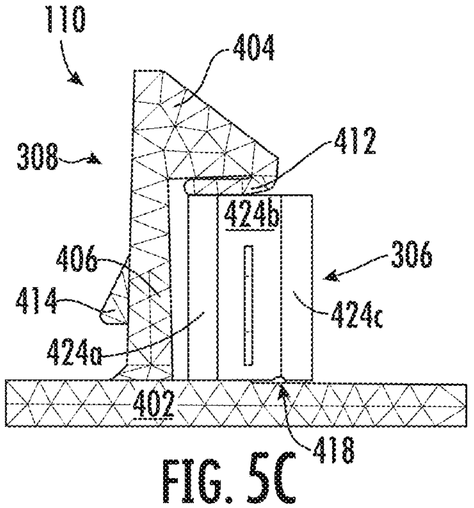
Figure 5D:
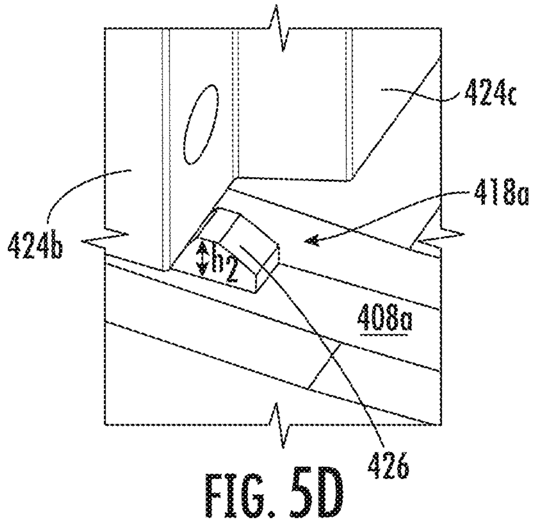

FIGS. 5A-5D are representative drawings of the spare fuse holder 110 of the fuse holder 100 of FIG. 1, according to exemplary embodiments. FIGS. 5A-5C are side views of the spare fuse holder 110, with FIG. 5A showing a first fuse insertion point (clip is in resting state), FIG. 5B showing a second fuse insertion point (clip is in activated state), and FIG. 5C showing a third fuse insertion point (clip is in holding state), and FIG. 5D is a detailed perspective view of the fuse clip position at the third fuse insertion point. In FIGS. 5B and 5C, the overhead 404 and underhang 412 include cross-hatching to indicate a flexion or pressure-based deformation due to the sliding of the spare fuse 306 toward the shaft 406 of the clip 308. The clip 308 is in a resting state when the underhang has not been deformed; the clip is in an activated state when the underhang is deformed and the fuse clips have been pushed into the respective tracks 408; and the clip is in a holding state when the underhang is deformed and the fuse clips are no longer pushed into the respective tracks but have returned to an original position.

In FIG. 5A, the spare fuse 306 is adjacent, but not yet under the overhead 404 and underhang 412 of the clip 308. Thus, there is no cross-hatching of the overhead 404 and underhang 412, as these elements of the clip 308 are undisturbed. The portion 424*a* does not touch the angled tip portions 426 of the fuse clips 418, so the fuse clips remain undisturbed as well. Nevertheless, the slanted surfaces 420*a* and 420*b* of the base 402 are slightly angled, allowing the spare fuse 306 to readily move toward the shafts 406 of the clip 308.

In FIG. 5B, the spare fuse 306 is moved toward the shaft 406 of the clip 308, and the underhang 412 deforms upward, as the spare fuse is compressing the underhang 412 toward the overhead 404. At this stage, the portion 424*a* of the fuse body 422 is fully under the underhang 412 and the portion 424*b* is partially under the underhang. Further, the portion 424*b* is pushing against the angled tip portion 426 of the fuse clips 418, causing the fuse clips to move downward into their respective tracks 408. Both the underhang 412 and the overhead 404 are cross-hatched, indicating some flexion in response to the movement of the spare fuse 306 along the base 402 toward the shaft 406. Although the overhead 404 flexes a little, the shaft 406 of the clip 308 remains rigid, in some embodiments.

In FIG. 5C, the spare fuse 306 is fully engaged with the clip 308, with portion 424*a* being flush against the shafts 406. Once the portion 424*b* moves past the angled tip portion 426 of the fuse clips 418, the fuse clips move from a downward position inside the tracks 408 back to the original position. The backside of the angled tip portion 426 is flush against the portion 424*b* of the fuse body 422.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A fuse holder comprising:

a housing for a fuse, the fuse to be connected to and protecting a circuit;

a clip comprising:

a base to seat a spare fuse;

a pair of shafts disposed upon and orthogonal to the base;

an overhead disposed upon and supported by the pair of shafts; and an underhang disposed beneath the overhead, the underhang to deform in response to a movement of the spare fuse along the base toward the pair of shafts; and a cover placed over the housing to form an enclosed space around the fuse and the clip.

2. The fuse holder of claim 1, wherein the overhead is triangular prism-shaped.

3. The fuse holder of claim 1, the clip further comprising the underhang coupled to one side of the overhead.

4. The fuse holder of claim 3, wherein the underhang is elastomeric.

5. The fuse holder of claim 1, the base further comprising:

a first surface to hold the pair of shafts;

a second surface adjacent the first surface; and a third surface adjacent the second surface, wherein the second surface and the third surface are angled relative to the first surface.

6. The fuse holder of claim 5, the base further comprising:

a first track disposed along a first side of the base, the first track having a first fuse clip disposed in the first track; and a second track disposed along a second side of the base, the second side being opposite the first side, the second track having a second fuse clip disposed in the second track.

7. The fuse holder of claim 6, wherein a distance between the first track and the second track is larger than a width of a first portion of a fuse body of the spare fuse.

8. The fuse holder of claim 7, the first fuse clip further comprising an angled tip portion to:

compress when a second portion of the fuse body slides along the base; and be adjacent the first portion when the clip is in a holding state.

9. The fuse holder of claim 1, the clip further comprising a fuse release disposed between the pair of shafts and extending beneath the overhang, wherein the fuse release pushes the spare fuse away from the pair of shafts, causing the spare fuse to be released from the clip.

10. The fuse holder of claim 1, wherein the housing and the cover are plastic.

11. The fuse holder of claim 9, wherein the fuse release is elastomeric.

* * * * *